(12) United States Patent
Heibel et al.

(10) Patent No.: US 12,529,806 B2
(45) Date of Patent: Jan. 20, 2026

(54) SELF-POWERED NUCLEAR RADIATION DETECTOR COMPRISING A CABLE ASSEMBLY AND A TEMPERATURE COMPENSATION ASSEMBLY, AND METHOD OF CORRECTING A TEMPERATURE RELATED CHANGE OF AN OUTPUT SIGNAL

(71) Applicant: Westinghouse Electric Company LLC, Cranberry Township, PA (US)

(72) Inventors: Michael D. Heibel, Broomfield, CO (US); Jorge Carvajal, Irwin, PA (US); Jeffrey Arndt, Pittsburgh, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 428 days.

(21) Appl. No.: 18/004,629

(22) PCT Filed: Jul. 1, 2021

(86) PCT No.: PCT/US2021/040107
§ 371 (c)(1),
(2) Date: Jan. 6, 2023

(87) PCT Pub. No.: WO2022/010737
PCT Pub. Date: Jan. 13, 2022

(65) Prior Publication Data
US 2023/0243987 A1    Aug. 3, 2023

Related U.S. Application Data

(60) Provisional application No. 63/048,476, filed on Jul. 6, 2020.

(51) Int. Cl.
*G01T 1/167* (2006.01)
*G01T 1/26* (2006.01)
(Continued)

(52) U.S. Cl.
CPC ............. *G01T 3/006* (2013.01); *G01T 1/26* (2013.01)

(58) Field of Classification Search
CPC .. G01T 1/16; G01T 1/167; G01T 1/26; G01T 1/29; G01T 1/2992; G01T 1/367; G01T 3/006
(Continued)

(56) References Cited

U.S. PATENT DOCUMENTS

| 4,008,399 A | * | 2/1977 | Brown | .................. G01T 3/006 376/153 |
| 4,087,693 A | * | 5/1978 | Brown | .................. H01B 3/082 374/E7.009 |

(Continued)

FOREIGN PATENT DOCUMENTS

| JP | S55-72179 U | 5/1980 |
| JP | S56-37079 U | 4/1981 |

(Continued)

OTHER PUBLICATIONS

International Search Report and Written Opinion for corresponding International PCT Application No. PCT/US2021/040107, dated Dec. 13, 2021.
(Continued)

*Primary Examiner* — Allen C. Ho
(74) *Attorney, Agent, or Firm* — K&L Gates LLP

(57) ABSTRACT

A self-powered nuclear radiation detector. The self-powered nuclear radiation detector includes a cable assembly, a temperature compensation assembly, and a metallic outer sheath. The cable assembly includes a metallic signal lead, an insulative material surrounding the metallic signal lead, and a metallic sheath surrounding the insulative material. The temperature compensation assembly includes a second metallic signal lead, a second insulative material surround-
(Continued)

ing the second metallic signal lead, and a second metallic sheath surrounding the second insulative material. The metallic outer sheath surrounds the cable assembly and the temperature compensation assembly.

20 Claims, 6 Drawing Sheets

(51) Int. Cl.
*G01T 1/29* (2006.01)
*G01T 3/00* (2006.01)

(58) Field of Classification Search
USPC ............ 250/370.04, 370.05, 370.09, 370.12, 250/370.14, 370.15, 390.01; 378/98.8
See application file for complete search history.

(56) References Cited

U.S. PATENT DOCUMENTS

| | | | | |
|---|---|---|---|---|
| 4,123,658 A * | 10/1978 | Johansson | ............... | G01T 3/006 250/390.01 |
| 4,237,380 A * | 12/1980 | Playfoot | ................. | G01T 3/006 250/370.04 |
| 4,238,676 A * | 12/1980 | Goldstein | ............... | G01T 3/006 250/370.04 |
| 4,267,454 A * | 5/1981 | Playfoot | ................. | G01T 3/006 250/370.04 |
| 4,313,792 A * | 2/1982 | Smith | ................. | G21C 17/102 376/247 |
| 4,363,970 A * | 12/1982 | Allan | ..................... | G01T 3/006 250/390.01 |
| 4,381,451 A * | 4/1983 | Chen | ....................... | G01T 3/006 250/390.01 |
| 4,396,839 A * | 8/1983 | Playfoot | ................. | G01T 3/006 250/370.04 |
| 4,434,370 A * | 2/1984 | Goldstein | ............... | G01T 3/006 250/370.04 |
| 4,554,456 A * | 11/1985 | Hagadorn | ............... | G01T 3/006 250/370.04 |
| 4,569,705 A * | 2/1986 | Allan | .................... | H01B 13/004 250/370.04 |
| 4,614,635 A | 9/1986 | Terhune | | |
| 5,745,538 A * | 4/1998 | Heibel | ................. | G21C 17/108 376/254 |
| 6,280,081 B1 | 8/2001 | Blau et al. | | |
| 8,445,839 B2 * | 5/2013 | Holaday | ................. | G01T 7/005 250/269.4 |
| 9,207,335 B2 * | 12/2015 | Popa | .................... | G21C 17/108 |
| 9,442,203 B2 * | 9/2016 | Fushimi | .................. | G01T 3/006 |
| 10,438,708 B2 * | 10/2019 | Heibel | ..................... | G21H 1/02 |
| 11,227,697 B2 * | 1/2022 | Johnson | .................. | G21C 17/108 |
| 11,250,967 B2 * | 2/2022 | Heibel | ..................... | G21C 3/40 |
| 11,262,250 B2 * | 3/2022 | Weber | .................... | G01K 7/186 |
| 11,289,236 B2 * | 3/2022 | Heibel | ..................... | G21H 1/04 |
| 11,430,578 B2 * | 8/2022 | Heibel | ..................... | G21C 7/22 |
| 11,621,091 B2 * | 4/2023 | Heibel | ..................... | G01T 3/02 376/247 |
| 11,694,816 B2 * | 7/2023 | Johnson | .................. | G01T 3/006 376/254 |
| 11,744,090 B2 * | 8/2023 | Im | .......................... | G01T 1/202 250/361 R |
| 11,947,054 B2 * | 4/2024 | Garing, III | .............. | G01T 3/006 |
| 12,080,434 B2 * | 9/2024 | Heibel | ................. | G21C 17/104 |
| 12,099,153 B2 * | 9/2024 | Goetz | .................... | G01T 3/006 |
| 2013/0083879 A1 | 4/2013 | Heibel et al. | | |
| 2019/0265110 A1 | 8/2019 | Weber | | |

FOREIGN PATENT DOCUMENTS

| | | |
|---|---|---|
| JP | S57-86477 U | 5/1982 |
| JP | 2017090076 A | 5/2017 |
| TW | 493064 B | 7/2002 |
| TW | 201939635 A | 10/2019 |

OTHER PUBLICATIONS

Vermeeren et al., Theoretical study of radiation induced electromotive force effects on mineral insulated cables, Review of Scientific Instruments (Nov. 1, 2003), 74(11):4667-4674.

Search Report for corresponding Taiwanese Application No. 112120909 mailed Mar. 1, 2024.

* cited by examiner

SELF-POWERED NUCLEAR RADIATION DETECTOR COMPRISING A CABLE ASSEMBLY AND A TEMPERATURE COMPENSATION ASSEMBLY, AND METHOD OF CORRECTING A TEMPERATURE RELATED CHANGE OF AN OUTPUT SIGNAL

CROSS-REFERENCE TO RELATED APPLICATIONS

This application is a U.S. National Stage Entry under 35 U.S.C. § 371 of International Patent Application No. PCT/US2021/040107, entitled SELF-POWERED NUCLEAR RADIATION DETECTOR AND METHOD OF CORRECTING A TEMPERATURE-RELATED CHANGE OF AN OUTPUT SIGNAL OF SAME, filed Jul. 1, 2021, which claims benefit under 35 U.S.C. § 119 (e) to U.S. Provisional Application No. 63/048,476 filed on Jul. 6, 2020, titled SELF-POWERED NUCLEAR RADIATION DETECTOR AND METHOD OF CORRECTING A TEMPERATURE-RELATED CHANGE OF AN OUTPUT SIGNAL OF SAME, the contents of which are hereby incorporated by reference in their entirety.

BACKGROUND

In some nuclear reactors, self-powered nuclear radiation detectors (SPNRD) are utilized to measure nuclear radiation levels near or inside a reactor core. The measured levels can then be utilized to indicate the reactor power level and the reactor power distribution, and the measured levels can be monitored to assist in the control of the nuclear reactor.

FIG. 1 illustrates a cross-section of a prior art self-powered nuclear radiation detector 10. The self-powered nuclear radiation detector 10 includes an electrically conductive element 12, an insulative material 14 such as, for example, a highly compressed magnesium oxide, which surrounds the electrically conductive element 12, a metallic sheath 16 which surrounds the insulative material 14 and by extension, the electrically conductive element 12. In various applications, the electrically conductive element 12 may be referred to as an emitter and the metallic sheath 16 may be referred to as a collector. The self-powered nuclear radiation detector 10 also includes cable assembly 20 configured to carry an output signal current of the self-powered nuclear radiation detector 10. The cable assembly 20 includes a metallic signal lead 22, an insulative material 24 which surrounds the metallic signal lead 22, and a metallic sheath 26 which surrounds the insulative material 24, and by extension, the metallic signal lead 22. The metallic signal lead 22 is electrically coupled to the electrically conductive element 12, and the composition of the metallic signal lead 22 may be similar or identical to the composition of the electrically conductive element 12. The composition of the insulative material 24 may be similar or identical to the composition of the insulative material 14. The metallic sheath 26 is in contact with the metallic sheath 16, and the composition of the metallic sheath 26 may be similar or identical to the composition of the metallic sheath 16. Due to the composition and arrangement of the cable assembly 20, the cable assembly 20 may be referred to as a mineral insulated cable assembly.

The detector 10 is considered "self-powered" because no electrical potential is required to be applied across the electrically conductive element 12 and the metallic sheath 16. Rather, an output signal of the detector 10 is generated as a function of the differing radiation response characteristics of the materials of the electrically conductive element 12 and the metallic sheath 16. In general, the material of the electrically conductive element 12 is generally selected as the more radiation-responsive material and can be selected to be a neutron-responsive or gamma-responsive material, based on the particular type of application and nuclear reactor. In operation, radiation from the nuclear reactor passes through the metallic sheath 16, through the insulative material 14 and through the electrically conductive element 12. Due to the differing radiation response for the different materials, an output signal (i.e., a current) is induced which is applied to and carried by the metallic signal lead 22 of the cable assembly 20. The output signal is a function of the radiation level and the reactor core. The output signal can be measured and utilized to indicate the reactor power level and the reactor power distribution.

Changes in the temperature in the environment surrounding the insulative material 14 and the insulative material 24, which can be extremely high, can cause the magnitude of the output signal applied to and carried by the metallic signal lead 22 to change. Such a change in the magnitude of the output signal caused by a change in the temperature surrounding the insulative material 14 and the insulative material 24 can make the relationship between the output signal and the reactor power level and/or the reactor power distribution appear to change. If this "temperature effect" is not properly accounted for, it can cause the output signal carried by the metallic signal lead 22 to reflect an incorrect value of the reactor power level and/or the reactor power distribution. Such an inaccuracy can lead to unsafe operation of the nuclear reactor. The above-described "temperature effect" is of particular concern for nuclear reactors with high coolant/moderator temperatures such as, for example. High Temperature Gas Reactors and Liquid Metal Reactors (including Liquid Metal Fast Reactors). The above-described "temperature effect" is also of concern for nuclear reactor designs which operate at relatively small power levels, where the output signal levels of the detectors 10 associated therewith am also relatively low.

BRIEF DESCRIPTION OF THE DRAWINGS

The novel features of the aspects described herein are set forth with particularity in the appended claims. The aspects, however, both as to organization and methods of operation may be better understood by reference to the following description, taken in conjunction with the accompanying drawings.

DETAILED DESCRIPTION

Figure 1:
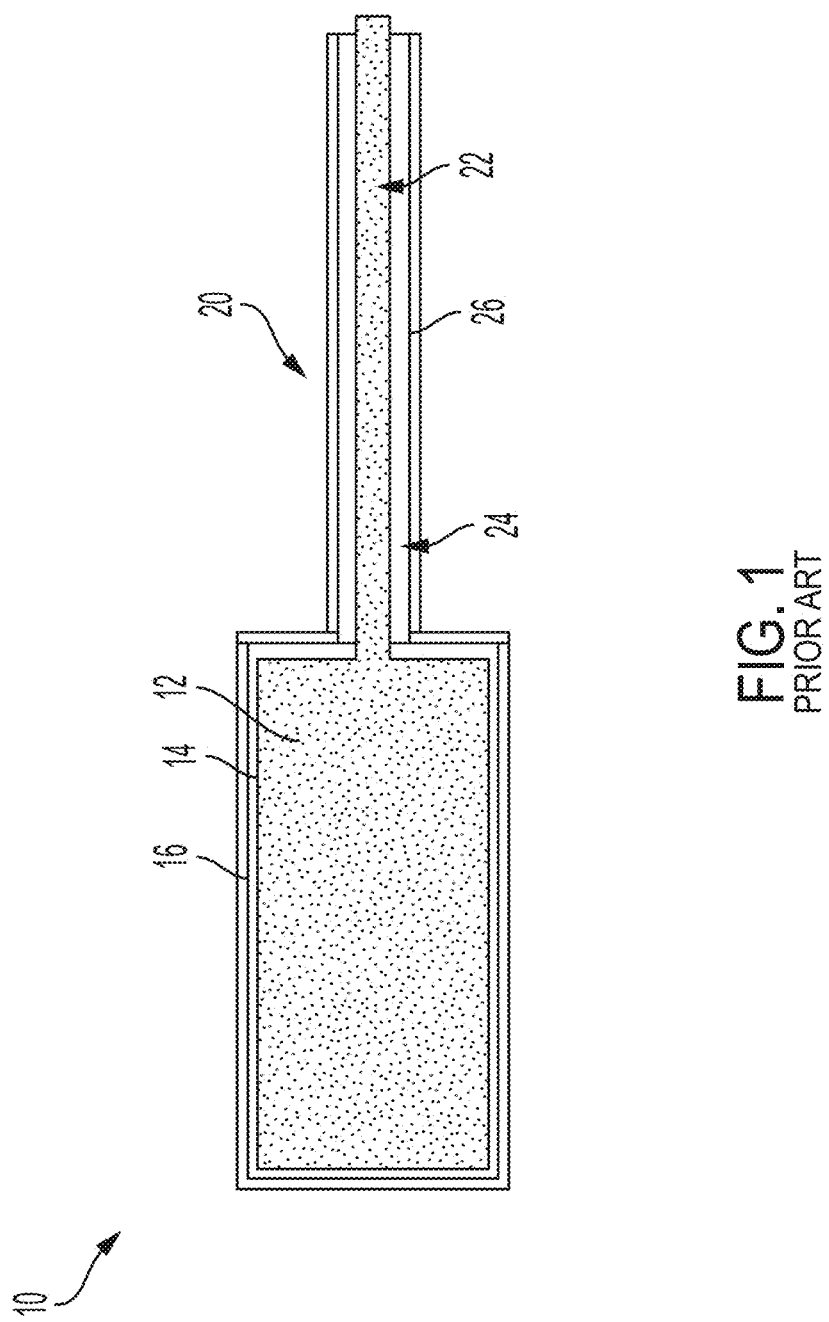
FIG. 1 illustrates a cross-section of a prior art self-powered nuclear radiation detector.

It is to be understood that at least some of the figures and descriptions of the invention have been simplified to illustrate elements that are relevant for a clear understanding of the invention, while eliminating, for purposes of clarity, other elements that those of ordinary skill in the art will appreciate may also comprise a portion of the invention. However, because such elements are well known in the art, and because they do not facilitate a better understanding of the invention, a description of such elements is not provided herein.

In the following detailed description, reference is made to the accompanying drawings, which form a part hereof. In the drawings, similar symbols and reference characters typically identify similar components throughout several views, unless context dictates otherwise. The illustrative aspects described in the detailed description, drawings and claims are not meant to be limiting. Other aspects may be utilized, and other changes may be made, without departing from the scope of the technology described herein.

The following description of certain examples of the technology should not be used to limit its scope. Other examples, features, aspects, embodiments and advantages of the technology will become apparent to those skilled in the art from the following description, which is by way of illustration, one of the best modes contemplated for carrying out the technology. As will be realized, the technology described herein is capable of other different and obvious aspects, all without departing from the technology. Accordingly, the drawings and descriptions should be regarded as illustrative in nature and not restrictive.

It is further understood that any one or more of the teachings, expressions, aspects, embodiments, examples, etc. described herein may be combined with any one or more of the other teachings, expressions, aspects, embodiments, examples, etc. that are described herein. The following described teachings, expressions, aspects, embodiments, examples. etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Before explaining the various aspects of the self-powered nuclear radiation detector in detail, it should be noted that the various aspects disclosed herein are not limited in their application or use to the details of construction and arrangement of parts illustrated in the accompanying drawings and description. Rather, the disclosed aspects may be positioned or incorporated in other aspects, embodiments, variations and modifications thereof, and may be practiced or carried out in various ways. Accordingly, aspects of the self-powered nuclear radiation detector disclosed herein are illustrative in nature and are not meant to limit the scope or application thereof. Furthermore, unless otherwise indicated, the terms and expressions employed herein have been chosen for the purpose of describing the aspects for the convenience of the reader and are not meant to limit the scope thereof. In addition, it should be understood that any one or more of the disclosed aspects, expressions of aspects, and/or examples thereof, can be combined with any one or more of the other disclosed aspects, expressions of aspects, and/or examples thereof, without limitation.

Also, in the following description, it is to be understood that terms such as inward, outward, upward, downward, above, top, below, floor, left, right, side, interior, exterior and the like are words of convenience and are not to be construed as limiting terms. Terminology used herein is not meant to be limiting insofar as devices described herein, or portions thereof, may be attached or utilized in other orientations. The various aspects will be described in more detail with reference to the drawings.

Figure 2:
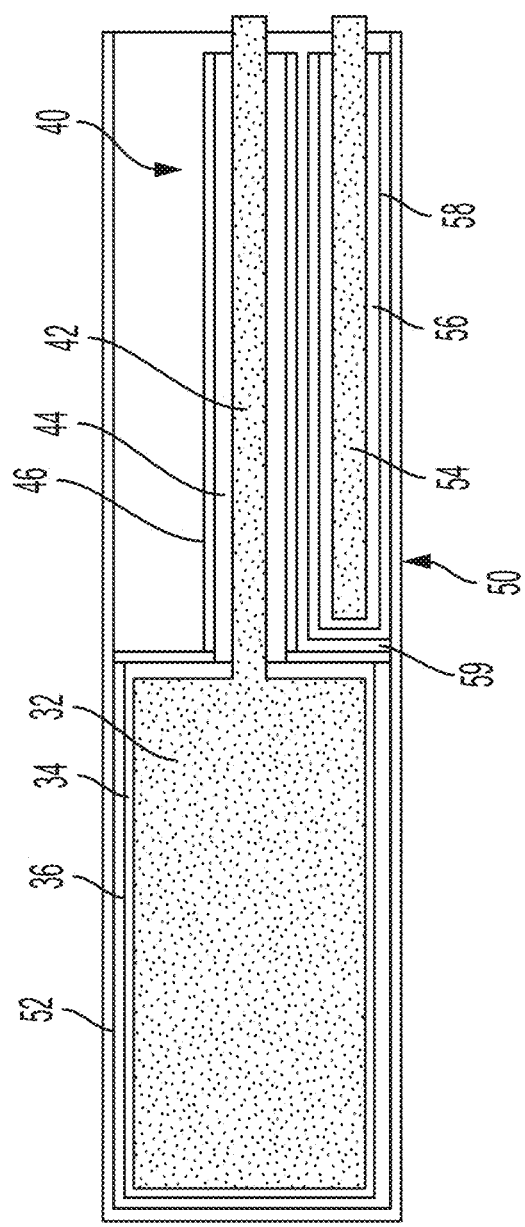
FIG. 2 illustrates a cross-section of a self-powered nuclear radiation detector, in accordance with at least one aspect of the present disclosure.

FIG. 2 illustrates a cross-section of a self-powered nuclear radiation detector 30, in accordance with at least one aspect of the present disclosure. The self-powered nuclear radiation detector 30 is configured to generate an output signal (i.e., a current) which provides an accurate indication of the power level and the power distribution of a nuclear reactor, regardless of the temperature proximate the various components of the self-powered nuclear radiation detector 30. The self-powered nuclear radiation detector 30 is similar to the self-powered nuclear radiation detector 10, but is different. The self-powered nuclear radiation detector 30 is similar to the self-powered nuclear radiation detector 10 in that the self-powered nuclear radiation detector 30 includes an electrically conductive element 32, an insulative material 34 (e.g., a highly compressed magnesium oxide) surrounding the electrically conductive element 32, and a metallic sheath 36 surrounding the insulative material 34, and by extension, the electrically conductive element 32.

The self-powered nuclear radiation detector 30 is also similar to the self-powered nuclear radiation detector 10 in that the self-powered nuclear radiation detector 30 also includes a cable assembly 40, where the cable assembly 40 includes a metallic signal lead 42, an insulative material 44 (e.g., a highly compressed magnesium oxide) which surrounds the metallic signal lead 42, and a metallic sheath 46 which surrounds the insulative material 44, and by extension, the metallic signal lead 42. The metallic signal lead 42 is electrically coupled to the electrically conductive element 32, and the composition of the metallic signal lead 42 may be similar or identical to the composition of the electrically conductive element 32. According to various aspects, the metallic signal lead 42 comprises cobalt, cadmium, rhodium, vanadium and/or combinations thereof. The composition of the insulative material 44 may be similar or identical to the composition of the insulative material 34. The metallic sheath 46 is in contact with the metallic sheath 36, and the composition of the metallic sheath 46 may be similar or identical to the composition of the metallic sheath 36. Due to the composition and arrangement of the cable assembly 40, the cable assembly 40 may be referred to as a mineral insulated cable assembly. In operation, radiation from the nuclear reactor passes through the metallic sheath 36, through the insulative material 34 and through the electrically conductive element 32. Due to the differing radiation response for the different materials, an output signal (i.e., a current) is induced. The induced current is applied to and carried by the metallic signal lead 42 of the cable assembly 40.

The self-powered nuclear radiation detector 30 is different from the self-powered nuclear radiation detector 10 in that the self-powered nuclear radiation detector 30 further includes a temperature compensation assembly 50 and a metallic outer sheath 52. The metallic outer sheath 52 surrounds the temperature compensation assembly 50, the metallic sheath 36 and the metallic sheath 46, and by extension, all of the other above-described components of the self-powered nuclear radiation detector 30. The composition of the metallic outer sheath 52 may be similar or identical to the composition of the metallic sheath 36 and/or the composition of the metallic sheath 46. The temperature compensation assembly 50 is described in detail hereinbelow. Also, as shown in FIG. 2, according to various aspects, the self-powered nuclear radiation detector 30 may also include a material 59 positioned between the temperature compensation assembly 50 and the cable assembly 40, as well as between the temperature compensation assembly 50 and the metallic sheath 36 (and by extension, between the temperature compensation assembly 50 and the electrically conductive element 32, and between the temperature compensation assembly 50 and the insulative material 34). According to various aspects, the material 59 may comprise aluminum oxide ($Al_2O_3$), helium or another suitable material.

Figure 3:
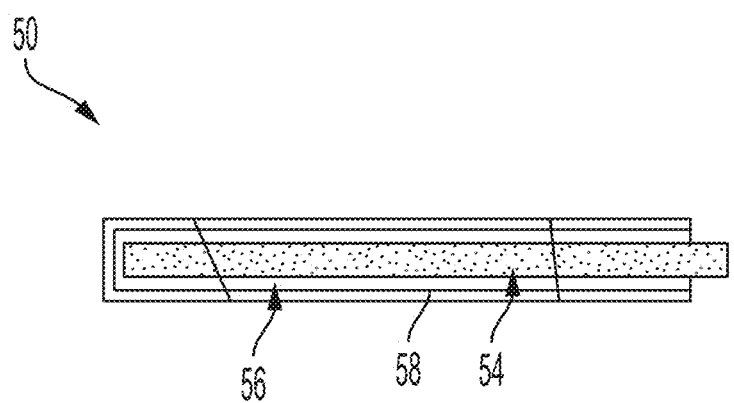
FIG. 3 illustrates a cross-section of a temperature compensation assembly of the self-powered nuclear radiation detector of FIG. 2, in accordance with at least one aspect of the present disclosure.

FIG. 3 illustrates a cross-section of the temperature compensation assembly 50, in accordance with at least one aspect of the present disclosure. The temperature compensation assembly 50 comprises a metallic signal lead 54, an insulative material 56 which surrounds the metallic signal lead 54, and a metallic sheath 58 which surrounds the insulative material 56, and by extension, the metallic signal lead 54. According to various aspects, the metallic signal lead 54 is configured as a cylindrically-shaped wire having a longitudinal axis, a radius, a diameter and a length associated therewith. The composition of the metallic signal lead 54 is the same as the composition of the metallic signal lead 42, the composition of the insulative material 56 is the same as the composition of the insulative material 44, and the composition of the metallic sheath 58 is the same as the composition of the metallic sheath 46. Due to the composition and arrangement of the temperature compensation assembly 50, the temperature compensation assembly 50 may be referred to as a mineral insulated cable assembly. In operation, radiation from the nuclear reactor passes through the metallic sheath 58, through the insulative material 56 and through the metallic signal lead 54, with differing radiation responses for the different materials, giving rise to an induced output signal (i.e., a current) which is carried by the metallic signal lead 54 of the temperature compensation assembly 50.

As shown in FIG. 2, the temperature compensation assembly 50 is positioned adjacent to and parallel to the cable assembly 40. The size and configuration of the temperature compensation assembly 50 is similar to or the same as (e.g., equal to) the size and configuration of the cable assembly 40. Although the overall length of the temperature compensation assembly 50 is shown in FIG. 2 as being slightly less than the overall length of the cable assembly 40 (the slight difference in the lengths can be as small as a few microns), it will be appreciated that the self-powered nuclear radiation detector 30 may be configured such that the overall length of the temperature compensation assembly 50 is the same as (e.g., equal to) the overall length of the cable assembly 40. Thus, a radial dimension of the temperature compensation assembly 50 is similar to or the same as (e.g., equal to) a corresponding radial dimension of the cable assembly 40. Also, the radial dimensions of the respective components of the temperature compensation assembly 50 (i.e., the metallic signal lead 54, the insulative material 56 and the metallic sheath 58) are similar to or the same as (e.g., equal to) corresponding radial dimensions of the respective components of the cable assembly 40 (i.e., the metallic signal lead 42, the insulative material 44 and the metallic sheath 46). For example, a radius or a diameter of the metallic signal lead 54 may be the same as (e.g., equal to) a radius or a diameter of the metallic signal lead 42, respectively. Additionally, an overall length of the temperature compensation assembly 50 is similar to or the same as (e.g., equal to) an overall length of the cable assembly 40. Furthermore, the overall lengths of the respective components of the temperature compensation assembly 50 (i.e., the metallic signal lead 54, the insulative material 56 and the metallic sheath 58) are similar to or the same as (e.g., equal to) the overall lengths of the respective components of the cable assembly 40 (i.e., the metallic signal lead 42, the insulative material 44 and the metallic sheath 46). In view of the above, it will be appreciated that according to various aspects, the temperature compensation assembly 50 and the cable assembly are congruent with one another.

The respective components of the temperature compensation assembly 50 and the respective components of the cable assembly 40 are subjected to the same radiation and the same temperature environment. Stated differently, the respective components of the temperature compensation assembly 50 will experience the same radiation and associated temperature environment as the respective components of the cable assembly 40. Also, as both the metallic sheath 58 of the temperature compensation assembly 50 and the metallic sheath 46 of the cable assembly 40 are in electrical contact with the metallic outer sheath 52, a common ground between the two is maintained.

In view of the above, it will be appreciated that for aspects where the radial dimensions and overall lengths of the temperature compensation assembly 50 and the cable assembly 40 are the same, the leakage resistance of the temperature compensation assembly 50 (i.e., the electrical resistance between the metallic signal lead 54 and ground) will change in the same fashion as the leakage resistance of the cable assembly 40 (i.e., the electrical resistance between the metallic signal lead 42 and ground). A relationship between (1) the change in the resistance of the insulative material 56 and/or the temperature compensation assembly 50 ($\Delta R_{TCA}$) from a reference temperature and (2) the change in the temperature of the insulative material 56 and/or the temperature compensation assembly 50 ($\Delta T_{TCA}$) from the reference temperature can be developed by a measuring the insulation resistance of the insulative material 56 and/or the temperature compensation assembly 50 ($R_{TCA}$) at different temperatures using standard measurement methods known by those skilled in the art, where the different temperatures include the expected operating temperature range of the self-powered nuclear radiation detector 30.

Additionally, a relationship between (1) the change in the output signal/current of the cable assembly 40 ($\Delta I_{CA}$) at a constant radiation level and (2) the change in insulation resistance of the insulative material 44 and/or the cable assembly 40 ($\Delta R_{CA}$) from a reference temperature may be determined by (a) exposing the cable assembly 40 to the appropriate nuclear radiation (e.g., neutron radiation, gamma radiation) from a fixed source and (b) measuring both (i) the electrical output signal/current of the cable assembly 40 ($\Delta I_{CA}$) and (ii) the insulation resistance of the insulative material 44 and/or cable assembly 40 ($R_{CA}$) at multiple known temperature conditions.

The temperature compensated current of the self-powered nuclear radiation detector 30 ($I_{TC}$) may then be determined by adding (1) the output current of the cable assembly 40 ($I_{CA}$) and (2) the product of (a) the measured change in the insulation resistance of the temperature compensation assembly 50 ($\Delta R_{TCA}$) from the reference value and (b) the slope of the calibration relationship between (i) the change of the output current of the cable assembly 40 ($\Delta I_{CA}$) and (ii) the measured change in the leakage resistance of the cable assembly 40 measured at different temperatures (ARCA). This may be expressed as a function of time using the equation:

$$I_{TC}(t) = I_{CA}(t) + (\Delta R_{TCA}(t))\left(\frac{\Delta ICA}{\Delta RCA}\right) \quad (1)$$

where $I_{TC}$ is the temperature compensated current of the self-powered nuclear radiation detector 30, t is time, $I_{CA}$ is the output current of the cable assembly 40, $R_{CA}$ is the leakage resistance of the cable assembly 40 and $R_{TCA}$ is the insulation resistance of the temperature compensation assembly 50.

Additionally, the induced current in the metallic signal lead 54 of the temperature compensation assembly 50 ($I_{TCA}$) resulting from gamma radiation may be used to filter out the gamma induced portion of the current in the metallic signal lead 42 of the cable assembly 40 by subtracting the measured gamma radiation induced current in the metallic signal lead 54 of the temperature compensation assembly 50 ($I_{TCA}$) from the current measured in the metallic signal lead 42 of the cable assembly 40 ($I_{CA}$). This is an important capability if the "corrected" output signal of the self-powered nuclear radiation detector 30 is to be reflective of neutron interactions. The total corrected current from a neutron sensitive self-powered nuclear radiation detector 30 may be expressed by the equation:

$$I_{TCC}(t) = I_{CA}(t) + \left[\left(\Delta R_{TCA}(t)\left(\frac{\Delta ICA}{\Delta RCA}\right)\right)\right] - I_{TCA}(t) \quad (2)$$

where $I_{TCC}$ is the total corrected current from a neutron sensitive aspect of the self-powered nuclear radiation detector 30, $I_{CA}$ is the output current of the cable assembly 40, $R_{CA}$ is the leakage resistance of the cable assembly 40, $R_{TCA}$ is the insulation resistance of the temperature compensation assembly 50 and $I_{TCA}$ is the measured gamma radiation induced current in the metallic signal lead 54 of the temperature compensation assembly 50.

Figure 4:
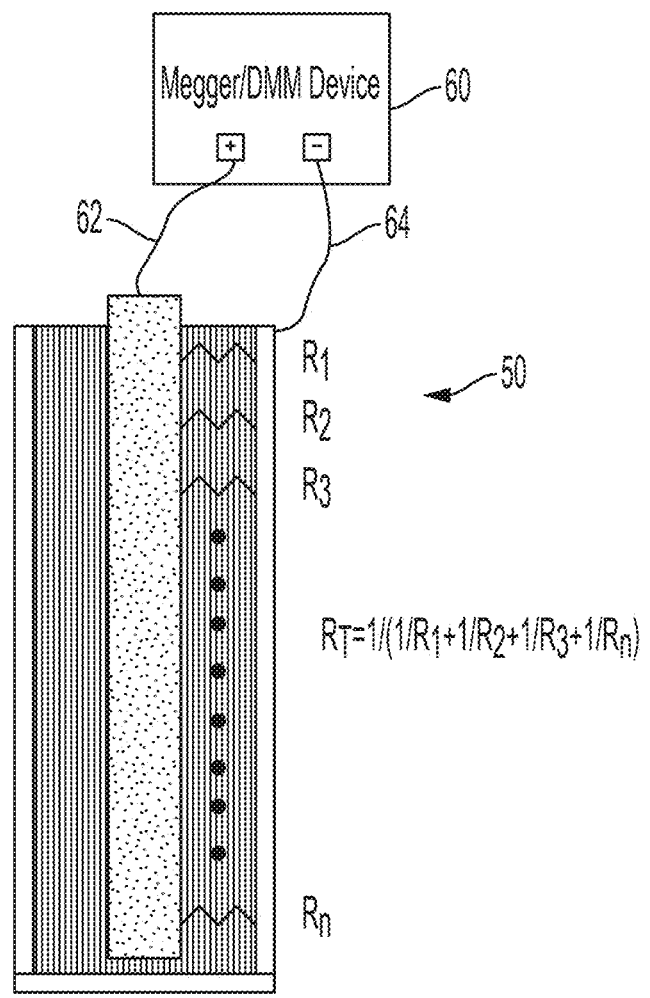
FIG. 4 illustrates a measurement device electrically coupled to the temperature compensation assembly of FIG. 3, in accordance with at least one aspect of the present disclosure.

FIG. 4 illustrates a measurement device 60 electrically coupled to the temperature compensation assembly 50 of FIG. 3, in accordance with at least one aspect of the present disclosure. The measurement device 60 may be implemented as, for example, a digital multimeter or a megger device, and can be utilized to measure and monitor the leakage resistance of the temperature compensation assembly 50 in real time and/or continuously. In general, the megger device would be utilized in instances where input voltages are relatively high. By positioning one probe 62 of the measurement device 60 on the metallic signal lead 54 of the temperature compensation assembly 50 and another probe 64 of the measurement device 60 at various locations on the metallic sheath 58 of the temperature compensation assembly 50 (e.g., at the locations labeled $R_1$, $R_2$, $R_3$, etc. in FIG. 4), the total leakage resistance of the temperature compensation assembly 50 can be determined based on the equation:

$$R_T = 1/(1/R_1 + 1/R_2 + 1/R_3 + \ldots 1/R_n) \quad (3)$$

where $R_T$ is the total leakage resistance of the temperature compensation assembly 50, and $R_1$, $R_2$, $R_3$, etc. are representative of the leakage resistance of the temperature compensation assembly 50 are various locations along a length of the temperature compensation assembly 50. The measurement device 60 can also be electrically coupled to the cable assembly 40 to measure and monitor the leakage resistance of the cable assembly 40 in a similar manner.

Figure 5:
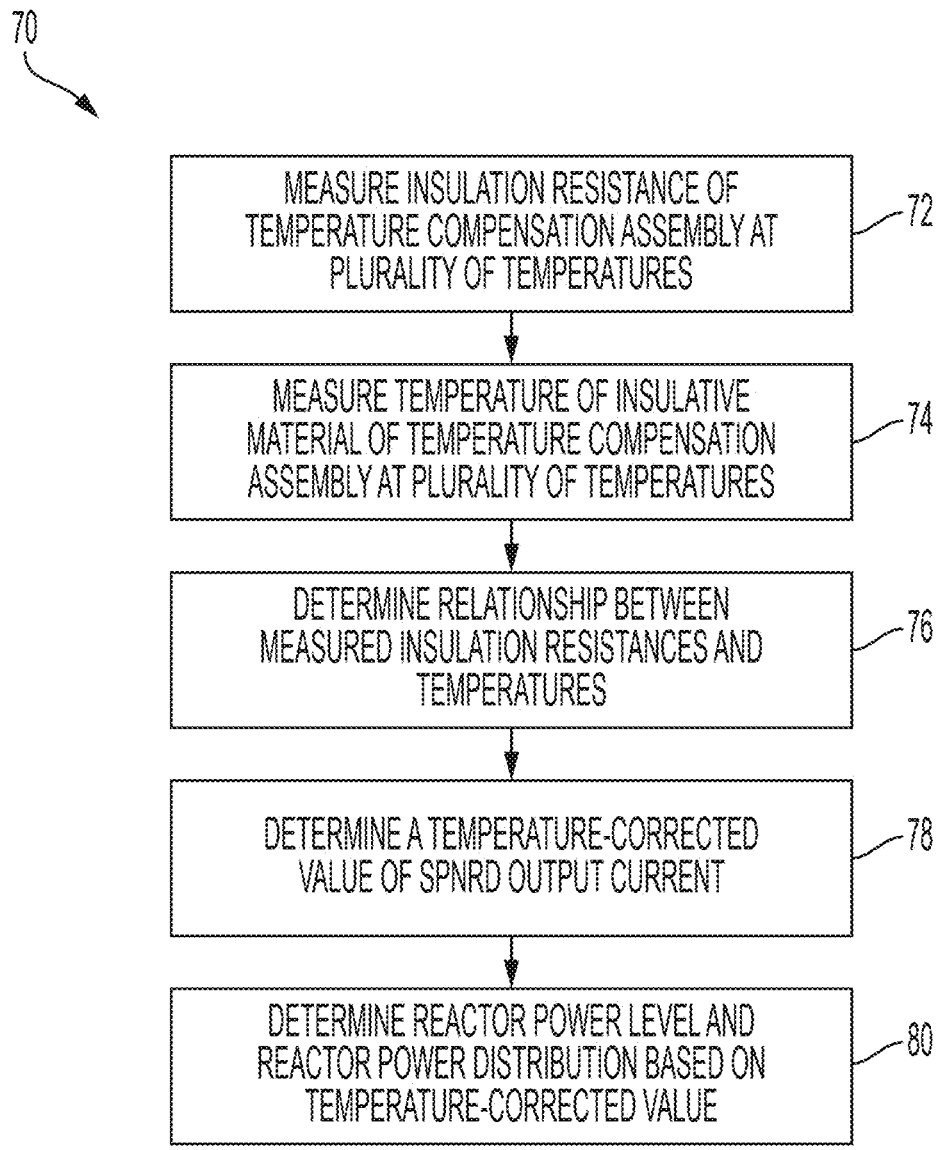
FIG. 5 illustrates a method of applying a temperature change correction to an electrical output signal of the self-powered nuclear radiation detector of FIG. 2, in accordance with at least one aspect of the present disclosure.

FIG. 5 illustrates a method 70 of correcting changes in the output current of the self-powered nuclear radiation detector 30, in accordance with at least one aspect of the present disclosure. The changes in the output current can be caused by changes in the temperature proximate the self-powered nuclear radiation detector 30, which can cause changes in the insulative value of the cable assembly 40 of the self-powered nuclear radiation detector 30, changes in the leakage resistance of the cable assembly 40 of the self-powered nuclear radiation detector 30, etc.

For the method 70, the insulation resistance of the temperature compensation assembly 50 is measured 72 at a plurality of different temperatures. The temperature of the insulative material 56 of the temperature compensation assembly 50 is also measured 74 at the plurality of different temperatures. According to various aspects, the respective measurements 72, 74 may be performed concurrently and/or simultaneously. Once the insulation resistances and the temperatures are measured, a relationship between the two can be determined 76. The determined relationship can then be utilized to determine 78 a "temperature-corrected" value of the output current of the self-powered nuclear radiation detector 30 to account for changes to the value of the output current of the self-powered nuclear radiation detector 30 caused solely by the temperature proximate the self-powered nuclear radiation detector 30. The corrected output current may then be utilized to determine 80 the reactor power level and the reactor power distribution. According to various aspects, the determination 78 of the "temperature-corrected" value of the output current of the self-powered nuclear radiation detector 30 and the determination 80 of the reactor power level and the reactor power distribution can be implemented by a control circuit (not shown) associated with a nuclear reactor. By utilizing the corrected output current, temperature-related errors associated with the determination of the reactor power level and the reactor power distribution are mitigated.

Figure 6:
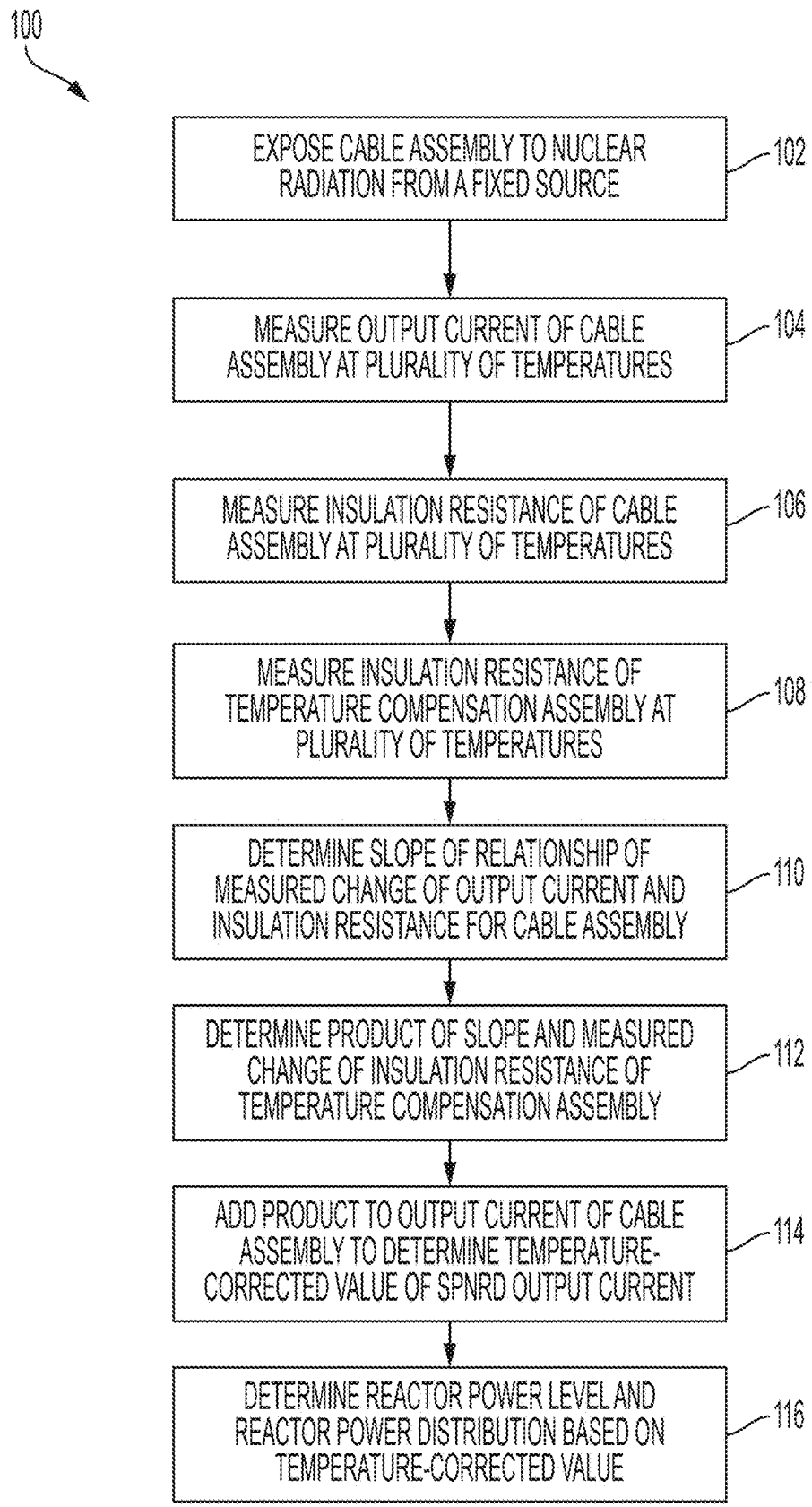
FIG. 6 illustrates another method of applying a temperature change correction to an electrical output signal of the self-powered nuclear radiation detector of FIG. 2, in accordance with at least one aspect of the present disclosure.

FIG. 6 illustrates a method 100 of correcting changes in the output current of the self-powered nuclear radiation detector 30, in accordance with at least one aspect of the present disclosure. The changes in the output current can be caused by changes in the temperature proximate the self-powered nuclear radiation detector 30, which can cause changes in the insulative value of the cable assembly 40 of the self-powered nuclear radiation detector 30, changes in the leakage resistance of the cable assembly 40 of the self-powered nuclear radiation detector 30, etc.

For the method 100, the cable assembly 40 is exposed 102 to an appropriate nuclear radiation (e.g., neutron radiation, gamma radiation) from a fixed source (e.g., a nuclear reactor). The output current of the cable assembly 40 ($I_{CA}$) is measured 104 at a plurality of different temperatures. The insulation resistance of the cable assembly 40 ($R_{CA}$) is measured 106 at the plurality of different temperatures. The insulation resistance of the temperature compensation assembly 50 ($R_{TCA}$) is measured 108 at the plurality of different temperatures. According to various aspects, one or more of the respective measurements 104, 106, 108 may be performed concurrently and/or simultaneously.

The slope of a relationship between the measured change of the output current of the cable assembly 40 ($\Delta I_{CA}$) and the measured change of the insulation resistance of the cable assembly 40 ($\Delta R_{CA}$) is determined 110. The product of the slope and the measured change of the insulation resistance of the temperature compensation assembly 50 ($\Delta R_{TCA}$) is determined 112. The product is then added to the output current of the cable assembly 40 ($I_{CA}$) to determine 114 the "temperature corrected" value of the output current of the self-powered nuclear radiation detector 30. The "temperature corrected" value of the output current of the self-powered nuclear radiation detector 30 accounts for changes to the value of the output current of the self-powered nuclear radiation detector 30 caused solely by the temperature proximate the self-powered nuclear radiation detector 30. The temperature corrected output current may then be utilized to determine 116 the reactor power level and the reactor power distribution. According to various aspects, the determination 114 of the "temperature corrected" value of the output current of the self-powered nuclear radiation detector 30 and the determination 116 of the reactor power level and the reactor power distribution can be implemented by a control circuit (not shown) associated with a nuclear reactor. By utilizing the temperature corrected output current, temperature-related errors associated with the determination of the reactor power level and the reactor power distribution are mitigated.

In view of the above, it will be appreciated that the configuration of the self-powered nuclear radiation detector 30 incorporates the basic configuration of existing types of self-powered nuclear radiation detectors (e.g., self-powered nuclear radiation detector 10), thereby allowing the use of the self-powered nuclear radiation detector 30 as an incore detector in reactor designs with very high operating temperatures without a loss of radiation measurement accuracy. The configuration of the self-powered nuclear radiation detector 30 allows for the accurate use of the self-powered nuclear radiation detector 30 as an incore detector in relatively low nuclear radiation reactor environments at very high temperatures. The configuration of the self-powered nuclear radiation detector 30 also allows for continuous compensation of the gamma radiation induced portion of the output signal of the self-powered nuclear radiation detector 30 when the metallic signal lead 42 is made from neutron-sensitive materials such as rhodium or vanadium.

EXAMPLES

Example 1—A self-powered nuclear radiation detector is provided. The self-powered nuclear radiation detector comprises a cable assembly, a temperature compensation assembly, and a metallic outer sheath. The cable assembly comprises a metallic signal lead, an insulative material surrounding the metallic signal lead, and a metallic sheath surrounding the insulative material. The temperature compensation assembly comprises a second metallic signal lead, a second insulative material surrounding the second metallic signal lead, and a second metallic sheath surrounding the second insulative material. The metallic outer sheath surrounds the cable assembly and the temperature compensation assembly.

Example 2—The self-powered nuclear radiation detector of Example 1, wherein the temperature compensation assembly is adjacent to and parallel to the cable assembly.

Example 3—The self-powered nuclear radiation detector of Examples 1 or 2, wherein an overall length of the temperature compensation assembly is equal to an overall length of the cable assembly.

Example 4—The self-powered nuclear radiation detector of Examples 1, 2 or 3, wherein an overall length of the second metallic signal lead is equal to an overall length of the metallic signal lead.

Example 5—The self-powered nuclear radiation detector of Examples 1, 2, 3 or 4, wherein an overall length of the second insulative material is equal to an overall length of the insulative material.

Example 6—The self-powered nuclear radiation detector of Examples 1, 2, 3, 4 or 5, wherein an overall length of the second metallic sheath is equal to an overall length of the metallic sheath.

Example 7—The self-powered nuclear radiation detector of Examples 1, 2, 3, 4, 5 or 6, wherein a radial dimension of the temperature compensation assembly is equal to a corresponding radial dimension of the cable assembly.

Example 8—The self-powered nuclear radiation detector of Examples 1, 2, 3, 4, 5, 6 or 7, wherein a radial dimension of the second metallic signal lead is equal to a corresponding radial dimension of the metallic signal lead.

Example 9—The self-powered nuclear radiation detector of Examples 1, 2, 3, 4, 5, 6, 7 or 8, wherein a radial dimension of the second insulative material is equal to a corresponding radial dimension of the insulative material.

Example 10—The self-powered nuclear radiation detector of Examples 1, 2, 3, 4, 5, 6, 7, 8 or 9, wherein a radial dimension of the second metallic sheath is equal to a corresponding radial dimension of the metallic sheath Example 11—The self-powered nuclear radiation detector of Examples 1, 2, 3, 4, 5, 6, 7, 8, 9 or 10, wherein the temperature compensation assembly is congruent with the cable assembly.

Example 12—The self-powered nuclear radiation detector of Examples 1, 2, 3, 4, 5, 6, 7, 8, 9, 10 or 11, wherein the metallic signal lead comprises at least one of the following: (1) cobalt. (2) cadmium; (3) rhodium, and (4) vanadium.

Example 13—A method of correcting a temperature-related change in an output current of a self-powered nuclear radiation detector is provided. The method comprises exposing the self-powered nuclear radiation detector to nuclear radiation from a fixed source, measuring the output current of the self-powered nuclear radiation detector at a plurality of different temperatures, measuring an insulation resistance of the self-powered nuclear radiation detector at the plurality of different temperatures, measuring an insulation resistance of a temperature compensation assembly of the self-powered nuclear radiation detector at the plurality of different temperatures; determining a slope of a relationship between (1) a measured change of the output current of the self-powered nuclear radiation detector and (2) a measured change of the insulation resistance of the self-powered nuclear radiation detector; determining a product of (1) the determined slope and (2) the measured change of the insulation resistance of the temperature compensation assembly of the self-powered nuclear radiation detector, and adding the determined product to the measured output current of the self-powered nuclear radiation detector to determine a temperature-corrected value of the output current of the self-powered nuclear radiation detector.

Example 14—The method of Example 13, wherein the nuclear radiation comprises neutron radiation.

Example 15—The method of Examples 14, wherein the nuclear radiation further comprises gamma radiation.

Example 16—The method of Examples 13, 14 or 15, further comprising measuring a gamma induced current in the temperature compensation assembly of the self-powered nuclear radiation detector, and subtracting the measured gamma induced current in the temperature compensation assembly of the self-powered nuclear radiation detector from the temperature-corrected value of the output current of the self-powered nuclear radiation detector.

Example 17—The method of Examples 13, 14, 15 or 16, further comprising utilizing at least one of the following to measure the insulation resistance of the self-powered nuclear radiation detector: (1) a multimeter; and (2) a megger device.

Example 18—The method of Examples 13, 14, 15, 16 or 17, further comprising utilizing at least one of the following to measure the insulation resistance of the temperature compensation assembly: (1) a multimeter; and (2) a megger device.

Example 19—The method of Examples 13, 14, 15, 16, 17 or 18, further comprising determining a reactor power level based on the temperature corrected value of the output current of the self-powered nuclear radiation detector.

Example 20—The method of Examples 13, 14, 15, 16, 17, 18 or 19, further comprising determining a distribution of reactor power based on the temperature corrected value of the output current of the self-powered nuclear radiation detector.

Although the various aspects of the self-powered nuclear radiation detector have been described herein in connection with certain disclosed aspects, many modifications and variations to those aspects may be implemented. Also, where materials are disclosed for certain components, other materials may be used. Furthermore, according to various aspects, a single component may be replaced by multiple components, and multiple components may be replaced by a single component, to perform a given function or functions. The foregoing description and the appended claims are intended to cover all such modifications and variations as falling within the scope of the disclosed aspects.

While this invention has been described as having exemplary designs, the described invention may be further modified within the spirit and scope of the disclosure. This application is therefore intended to cover any variations, uses, or adaptations of the invention using its general principles. For example, although the invention was described in the context of a self-powered nuclear radiation detector, the general principles of the invention are equally applicable to other types of detectors.

Any patent, patent application, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. A self-powered nuclear radiation detector, comprising:
    a cable assembly, comprising:
        a metallic signal lead;
        an insulative material surrounding the metallic signal lead; and
        a metallic sheath surrounding the insulative material;
    a temperature compensation assembly, comprising:
        a second metallic signal lead;
        a second insulative material surrounding the second metallic signal lead; and
        a second metallic sheath surrounding the second insulative material; and
    a metallic outer sheath surrounding the cable assembly and the temperature compensation assembly.

2. The self-powered nuclear radiation detector of claim 1, wherein the temperature compensation assembly is adjacent to and parallel to the cable assembly.

3. The self-powered nuclear radiation detector of claim 1, wherein an overall length of the temperature compensation assembly is equal to an overall length of the cable assembly.

4. The self-powered nuclear radiation detector of claim 1, wherein an overall length of the second metallic signal lead is equal to an overall length of the metallic signal lead.

5. The self-powered nuclear radiation detector of claim 1, wherein an overall length of the second insulative material is equal to an overall length of the insulative material.

6. The self-powered nuclear radiation detector of claim 1, wherein an overall length of the second metallic sheath is equal to an overall length of the metallic sheath.

7. The self-powered nuclear radiation detector of claim 1, wherein a radial dimension of the temperature compensation assembly is equal to a corresponding radial dimension of the cable assembly.

8. The self-powered nuclear radiation detector of claim 1, wherein a radial dimension of the second metallic signal lead is equal to a corresponding radial dimension of the metallic signal lead.

9. The self-powered nuclear radiation detector of claim 1, wherein a radial dimension of the second insulative material is equal to a corresponding radial dimension of the insulative material.

10. The self-powered nuclear radiation detector of claim 1, wherein a radial dimension of the second metallic sheath is equal to a corresponding radial dimension of the metallic sheath.

11. The self-powered nuclear radiation detector of claim 1, wherein the temperature compensation assembly is congruent with the cable assembly.

12. The self-powered nuclear radiation detector of claim 1, wherein the metallic signal lead comprises at least one of the following:
    cobalt;
    cadmium;
    rhodium; and
    vanadium.

13. A method of correcting a temperature-related change in an output current of a self-powered nuclear radiation detector, the method comprising:
    exposing the self-powered nuclear radiation detector to nuclear radiation from a fixed source;
    measuring an output current of the self-powered nuclear radiation detector at a plurality of different temperatures;
    measuring an insulation resistance of the self-powered nuclear radiation detector at the plurality of different temperatures;
    measuring an insulation resistance of a temperature compensation assembly of the self-powered nuclear radiation detector at the plurality of different temperatures;
    determining a slope of a relationship between (1) a measured change of the output current of the self-powered nuclear radiation detector at the plurality of different temperatures and (2) a measured change of the insulation resistance of the temperature compensation assembly of the self-powered nuclear radiation detector at the plurality of different temperatures;

determining a product of (1) the determined slope and (2) the measured change of the insulation resistance of the temperature compensation assembly of the self-powered nuclear radiation detector at the plurality of different temperatures; and adding the determined product to the measured output current of the self-powered nuclear radiation detector at the plurality of different temperatures to determine a temperature-corrected value of the output current of the self-powered nuclear radiation detector at the plurality of different temperatures.

14. The method of claim 13, wherein the nuclear radiation comprises neutron radiation.

15. The method of claim 14, wherein the nuclear radiation further comprises gamma radiation.

16. The method of claim 15, further comprising:

measuring a gamma radiation induced current in the temperature compensation assembly of the self-powered nuclear radiation detector; and subtracting the measured gamma radiation induced current in the temperature compensation assembly of the self-powered nuclear radiation detector from the temperature-corrected value of the output current of the self-powered nuclear radiation detector at the plurality of different temperatures.

17. The method of claim 13, further comprising utilizing at least one of the following to measure the insulation resistance of the self-powered nuclear radiation detector at the plurality of different temperatures:

a multimeter; and
a megger device.

18. The method of claim 13, further comprising utilizing at least one of the following to measure the insulation resistance of the temperature compensation assembly of the self-Dowered nuclear radiation detector at the plurality of different temperatures:

a multimeter; and
a megger device.

19. The method of claim 13, further comprising determining a reactor power level based on the corrected value of the output current of the self-powered nuclear radiation detector at the plurality of different temperatures.

20. The method of claim 13, further comprising determining a distribution of reactor power based on the temperature-corrected value of the output current of the self-powered nuclear radiation detector at the plurality of different temperatures.

* * * * *